United States Patent [19]
Matousek et al.

[11] Patent Number: 5,797,793
[45] Date of Patent: Aug. 25, 1998

[54] RESIDUE SPREADING APPARATUS FOR AGRICULTURAL COMBINES

[75] Inventors: Robert A. Matousek, Milan; Dan J. Burke; Jeffrey R. Payne, both of Moline, all of Ill.; Charles E. Volk, Devils Lake, N. Dak.

[73] Assignee: Case Corporation, Racine, Wis.

[21] Appl. No.: 610,814

[22] Filed: Mar. 7, 1996

[51] Int. Cl.$^6$ .............................. A01F 12/00; A01F 29/12
[52] U.S. Cl. .......................... 460/111; 460/119; 460/901; 56/13.3
[58] Field of Search ............................ 460/111, 112, 460/119, 150, 901; 56/12.8, 13.3

[56] References Cited

U.S. PATENT DOCUMENTS

| | | | |
|---|---|---|---|
| 3,669,123 | 6/1972 | Gaeddert et al. | 460/112 |
| 3,827,443 | 8/1974 | Drayer | |
| 4,230,130 | 10/1980 | Staiert | |
| 4,250,897 | 2/1981 | Glaser | |
| 4,344,442 | 8/1982 | Torland et al. | |
| 4,526,180 | 7/1985 | Scott et al. | 460/112 |
| 4,617,942 | 10/1986 | Garner | |
| 4,735,216 | 4/1988 | Scott et al. | |
| 4,900,290 | 2/1990 | Tanis et al. | 460/70 |
| 4,923,431 | 5/1990 | Miller et al. | |
| 5,021,030 | 6/1991 | Halford et al. | |
| 5,120,275 | 6/1992 | Zacharias | 460/111 |
| 5,542,883 | 8/1996 | Cruson | 460/112 |
| 5,569,081 | 10/1996 | Baumgarten et al. | 460/901 X |

FOREIGN PATENT DOCUMENTS

| 0212337 | 3/1987 | European Pat. Off. | 460/111 |
|---|---|---|---|

*Primary Examiner*—Terry Lee Melius
*Attorney, Agent, or Firm*—Mayer, Brown & Platt

[57] ABSTRACT

An apparatus connectable toward a downstream end of an agricultural combine for uniformly distributing residue material over a broad area. The apparatus is rotatable within a housing and about an axis extending generally parallel to a longuitudinal axis of the combine for distributing residue material from opposite sides of the combine. In those combines that use a cleaning system including a blower for directing a stream of air rearwardly toward a discharge end of the combine, the apparatus of the present invention accepts the stream of cleaning air from the blower and redirects or turns the air along with the residue material entrained therewith outwardly from opposite sides of the combine to broadly distribute the residue under the influence of an air flow thereby projecting the residue material over a broad area with uniformity.

40 Claims, 4 Drawing Sheets

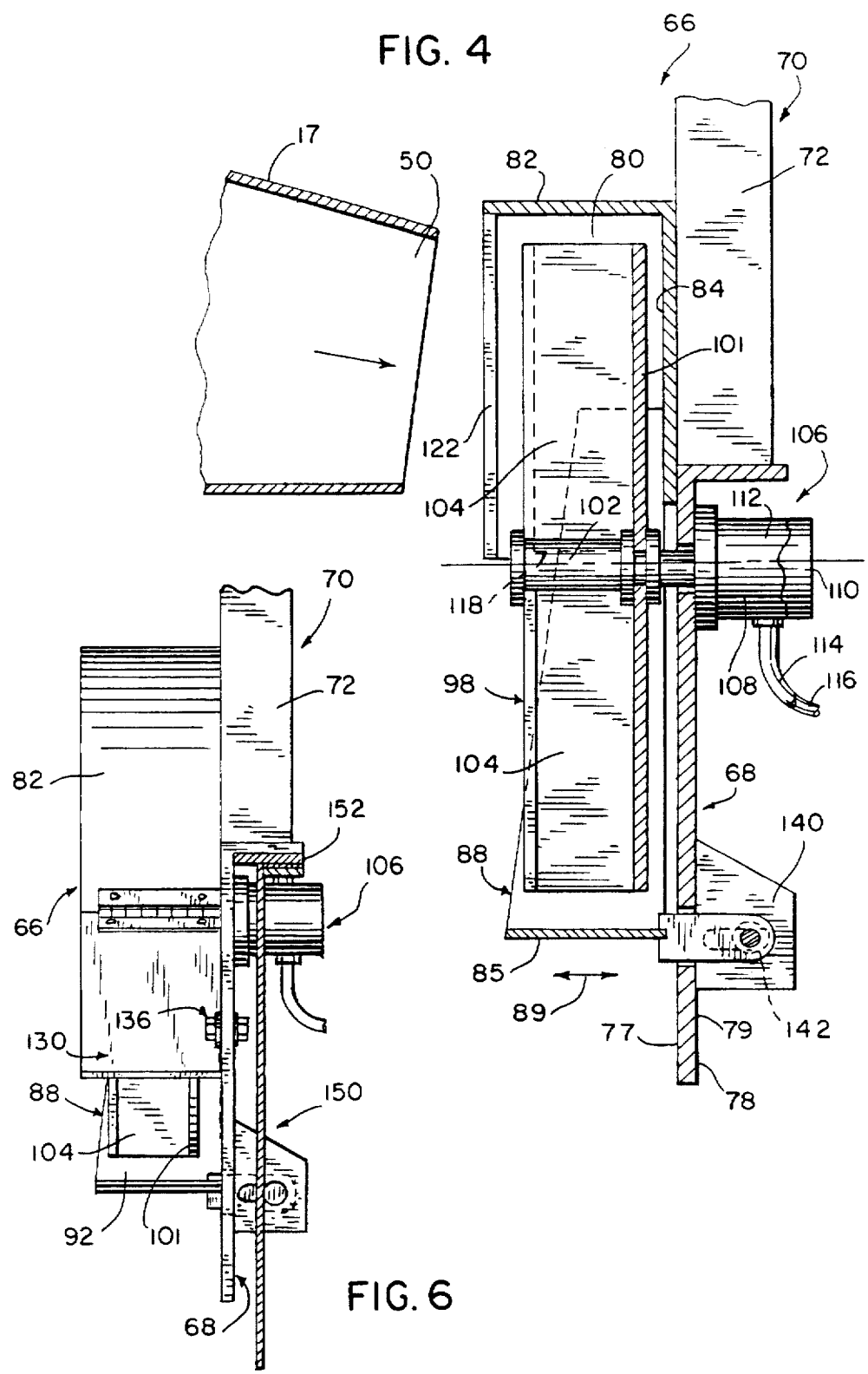

RESIDUE SPREADING APPARATUS FOR AGRICULTURAL COMBINES

FIELD OF THE INVENTION

The present invention generally relates to agricultural combines and, more specifically, to a mechanism for spreading residue material exhausted from a rear end portion of an agricultural combine.

BACKGROUND OF THE INVENTION

Agricultural threshing machines of various types are in common use today. These various types of threshing machines or agricultural combines perform the following functions: (1) harvesting or removing crop material from the ground of the field over which the combine is driven; (2) threshing the crop materials to separate a grain rich mixture from husks, straw, chaff and other residue material; and (3) collecting the grain while leaving behind the straw, chaff, husks and residue material other than grain.

To increase the harvesting capacity of today's combine, the header assembly typically mounted toward a front end of the combine has been significantly increased in size. Some header assemblies now range in width up to about 40 or more feet. Thus, after the combine has harvested the crop materials in the field, a 40 foot swath follows the combine. Governmental regulations require, in certain types of soil, that a specified amount of residue material be left as a cover on the ground. Notably, soil conditions that are highly susceptible to erosion require a greater amount of residue to remain in covering relation to the ground to inhibit erosion.

Recently, the economics of farming have dictated that a farmer may no longer plow. Accordingly, no-till planters and minimum till planters have been commercially developed to plant on ground surfaces that have not been plowed. But, and unless the residue is evenly distributed across a field, however, the toxicity of the residue material comprising the top or cover layer on the soil may have an adverse effect on the growth of the seed and plant. Thus, it is important to evenly distribute the residue over the ground area it was taken from.

Most agricultural combine technology today utilize a cleaning system having a blower or fan for producing an air stream used to further separate grain from relatively fine and extremely lightweight chaff and related residue material passing from the threshing apparatus. A large percentage of the residue material discharged from a rear end of the combine is comprised of such relatively fine, lightweight chaff particles such as hulls and husks that surround the seed. Because of the very light nature of the residue material, it is inherently difficult to handle and yet it is important to spread the residue material evenly across a wide swath on the field as it is discharged from the combine, rather than dumping it in irregular concentrated clumps. As will be appreciated, windy weather conditions exacerbate the problem of how to spread very light residue materials with uniformity across a band or swath measuring from 50 feet to 60 feet in width.

As efficient as today's combine technology has become, there will always be a certain degree of inadvertent grain loss from the combine along with the residue materials. The grain lost from the combine is deposited on the field and has a natural tendency to grow. Farmers that utilize no-till techniques, therefore, need to kill the grain inadvertently commingled with the residue material and which is lost from the combine. The dosages or amounts of chemical used by the farmer to destroy or kill the inadvertently lost grain will also be a function of the ability of the combine to distribute the materials with uniformity across the harvested swath. Understandably, on those combines having poor residue material distribution devices, there will be a higher concentration of inadvertently lost grain in areas proximate to the path of the combine. Accordingly, the farmer is required to use higher dosages of chemicals to kill the grain that is poorly distributed along with the residue by the combine. Understandably, the more chemicals that are required, the higher costs to the farmer. Thus, and because inadvertent grain loss from the combine is unavoidable, it is also advantageous to have the ability to broadly distribute the inadvertently lost grain over a wide band or swath.

Conventional combines are known to include a straw spreader typically comprised of a pair of horizontally disposed discs that each rotate about a vertical axis and have residue material dropped onto a top surface thereof. The spinning action of the discs tends to throw the residue material primarily to the rear of the combine. These known devices have several drawbacks. First, the conventional horizontally spinning discs do not offer an even distribution of residue material across a broad band or swath. A large percentage of the residue material discharged from the rear of the combine is very light in weight and therefor understandable difficult to distribute over a broad area. That is, once this extremely light material is discharged from the spinning discs there is no other force propelling it outwardly over a broad area. Accordingly, it tends to quickly fall to the ground. Second, these known horizontal spinning discs offer little or no control over the distribution of the residue material. Thus, the ability to uniformly distribute the residue material over a broad area is not achievable with two spinning discs.

As will be appreciated, the header assembly tends to gather a considerable amount of crop material over a 40 foot or greater swath. A relatively large percentage of the crop material harvested by the header assembly is exhausted as residue material from the rear end of the combine. The inability to control the discharge of residue material from the combine often results in blockage of an exhaust opening through which the residue materials pass on their way to the spreader apparatus. Obscuring of the residue material outlet or exhaust opening inhibits the passage of residue materials outwardly and, thus, the internal threshing and cleaning areas of the combine quickly become completely clogged with straw and other residue materials.

When the exhaust outlet of the combines becomes clogged or blocked in those combine having a cleaning system that utilize a blower to further promote separation of grain from material other than grain, the cleaning air cannot exhaust through the outlet and, thus, the chamber wherein the separator assembly is disposed becomes pressurized whereby adversely effecting performance of both the threshing assembly and the cleaning system. The combine operator is, therefore, required to cease the harvesting operation to unclog or unblock the residue material exhaust opening to return the agricultural combine to working order. Of course, valuable time is lost to return the combine to working order. Moreover, and as will be appreciated, time is of the essence and is a premium during harvesting operations.

Thus, there is a need and a desire for a residue spreading apparatus for an agricultural combine that is capable of receiving residue material as it issues from a rear outlet opening on the combine and propelled the residue material outwardly from the combine in a controlled generally uniform pattern over a substantial distance.

SUMMARY OF THE INVENTION

The present invention provides a novel spreading mechanism that is attachable to a rear end of a combine for broadly distributing residue material in a controlled uniform pattern extending over a substantial distance. According to the present invention, the residue material is distributed outwardly under the influence of an apparatus including an assembly that rotates about a generally horizontal axis such that the residue material is distributed in an air stream in a generally uniform pattern to a side of the combine. In a preferred form of the invention, the apparatus of the present invention includes a housing positioned in crop receiving relation relative to a residue material discharge outlet on the combine. The housing comprises a recess that opens to a threshing assembly of the combine. The recess is defined by a wall portion that includes an exhaust outlet. A vaned assembly is mounted for driven rotation in the recess of the housing from imparting movement to the residue material received from the threshing assembly. The chaff, straw and other residue materials are mixed with each other by the vaned assembly and the commingled residue material is entrained in the vertical stream of air directed outwardly from opposite sides of the combine.

In a preferred form of the invention, the housing of the spreader mechanism includes a pair of side-by-side recesses that are partially defined by a shroud or suitable wall portion extending generally normal to the housing. The recesses are arranged on opposite sides of the longitudinal axis of the combine. Each recess has an exhaust outlet that opens through a respective side of the combine. In this embodiment, the vaned assembly is comprised of two vaned members or fans are mounted for rotation in the two recesses. Upon rotation of the vaned members, residue material is entrained in a vertical stream of air and directed outwardly from a respective discharge outlet in the shroud.

Preferably, the spreading apparatus includes a drive mechanism for drivingly rotating the vaned assembly. In that embodiment of the invention utilizing two vaned members, the drive mechanism is capable of driving both vaned members at selected operational speeds relative to each other. In a preferred form, the driving mechanism comprises an independent driven mechanisms for each vaned member.

The spreading mechanism of the present invention is suited for use with a rotary combine having a rotary assembly arranged in material receiving relation relative to a conventional header assembly mounted toward a front end of the combine. The rotary assembly threshes the harvested materials received from the header assembly to separate grain from chaff, straw and other residue materials other than grain. As is conventional, rotary combines include a cleaning system for supplementing the separation of a grain rich mixture from residue materials other than grain. Such a cleaning system typically includes a blower or fan that directs a generally horizontal stream of air beneath the rotor assembly such that the lighter weight residue materials become entrained with the horizontal stream of air and are directed toward a discharge end of the combine, while the heavier grain rich mixture passes to a collection area.

The apparatus of the present invention includes an assembly mounted on a housing for rotation about a generally horizontal axis. Upon rotation of the assembly, the residue materials are mixed and the generally vertical stream of air is directed outwardly from opposite sides of the combine. The housing includes a shroud having an arcuate wall portion axially extending forwardly from the housing and defining a recess wherein the fan is rotatably arranged, and that opens to the rotary assembly of the combine. The shroud on the housing defines an outlet that opens to a side of the combine and through which residue material is expelled from the housing.

In a preferred form of the invention, the assembly mounted in the housing is comprised of dual rotary vaned members mounted on opposite sides of the longitudinal axis of the combine. In this embodiment of the invention, the housing defines two recesses in which the bladed discs are mounted, with each recess defining an outlet that opens to a side of the combine and through which residue material is exhausted. In a most preferred form of the invention, at least a portion of the shroud is axially adjustable relative to the housing toward and a way from the rotary assembly to facilitate the transference of materials between the rotary assembly and the spreader apparatus of the present invention.

An object of the present invention is to provide an apparatus that has an affinity for air such that upon operation of the present invention it draws or pulls the generally horizontal stream of air from the cleaning system, along with the residue material entrained therewith, through the residue material outlet and then blows or redirects the air and residue material drawn through the outlet away from the residue material outlet in a direction generally normal to the longitudinal axis of the combine. With the present invention, the air drawn from the cleaning system is used to forcibly redirect the residue material away from the outlet on the combine inhibits blockage thereof. Directing the residue material under the influence of an air stream advantageously causes the chaff, straw and other lightweight materials to be propelled further outwardly in a generally uniform distribution over a wide path extending, preferably, to opposite sides of the combine. Moreover, by accepting the air that been brought up to velocity by the cleaning system and then using the apparatus of the present invention to merely turn or deflect the air thereby the power requirements for the apparatus can be significantly reduced.

Another feature of the present invention concerns the ability to control the extent to which the residue material is spread to the side of the combine. Preferably, each outlet defined by the shroud of the housing has a controller operably associated therewith. That is, the housing of the present invention preferably includes a wing or a vane that extends outwardly from the exhaust opening in the shroud. The purpose of the vane extending outwardly from the outlet is to control the residue material passing out of the outlet in the direction of the vertically directed airstream.

As mentioned, windy weather conditions can, and often do, affect the distribution of residue materials from the combine. In this regard, and because the present invention exhausts residue materials primarily to the side rather than to the rear of the combine, another aspect of the present invention relates to a wind shield that is connected to and extends laterally from the combine. In a most preferred form of the invention, the wind shield extends to opposite sides of the combine. Accordingly, residue materials exhausted in the vertical airstream are distributed in a generally uniform pattern notwithstanding particular weather conditions.

An important advantage of the present invention is the provision of an assembly mounted across rear end of the combine and that rotates about a generally horizontal axis extending generally parallel to the longitudinal axis of the machine and has the ability to entrain the vast majority of residue material in an airstream directed outwardly in a direction generally normal to the longitudinal axis of the combine so as to evenly distribute the residue materials over a broad area. Another object of the present invention relates to the ability to combine the lighter residue materials with the straw and other heavier residue materials such that both are uniformly distributed over a broad area. A still further object of the present invention is to provide a combine discharge apparatus that is well suited to the uniform distribution of residue material over a broad area while remaining simple in construction and economical in operation.

These and other objects, aims and advantages of the present invention will become readily apparent from the following detailed description, the appended claims and the following drawings.

DETAILED DESCRIPTION OF THE DRAWINGS

FIG. 4 is a sectional view taken along line 4—4 of FIG. 3;

FIG. 6 is a sectional view taken along line 6—6 of FIG. 5; and

DETAILED DESCRIPTION OF THE INVENTION

Figure 1:
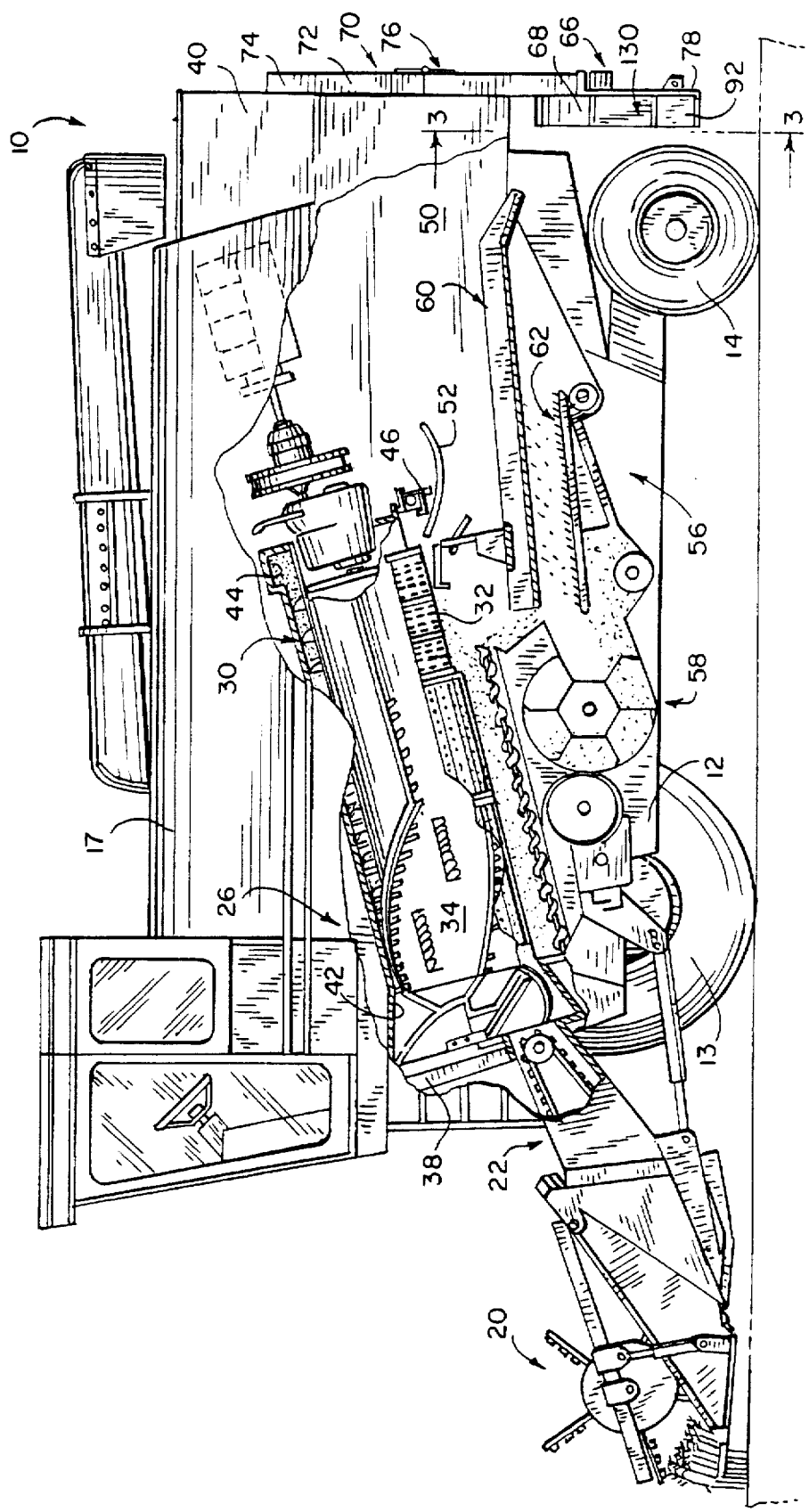
FIG. 1 is a side elevational view, partly in section, of an agricultural combine utilizing the discharge apparatus of the present invention.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals indicate like parts throughout the several views, there is shown in FIG. 1 an agricultural combine including a fore-and-aft elongated mobile frame 12 that is preferably supported on pairs of front and rear ground engaging wheels 13 and 14, respectively, and defines a longitudinal axis 16 for the combine 10. The combine 10 includes a housing 17 supported on and movable with frame 12 of combine 10. Housing 17 defines opposite sides 18 and 19 (FIG. 2) of the combine 10. A conventional header assembly 20 is mounted toward a front end of the combine 10 by a feeder assembly 22. As is known in the art, the header assembly 20 harvests crop material as the combine is driven over the ground and across the field. The header assembly 20 can be configured in widths up to 40 feet or more.

As is typical, combine 10 further includes a threshing assembly 26 mounted in housing 17 and which is arranged in crop receiving relation relative to the feeder assembly 22. The purpose of the threshing assembly 26 is to thresh and separate the harvested crop material into a grain rich mixture and residue materials typically comprised of chaff, straw, end tailings, husks and other fine and extremely lightweight materials.

Although the present invention is equally applicable to all combines having a threshing apparatus for separating the crop materials into a grain rich mixture and residue materials, the present invention is shown mounted to a rotary combine including a rotary threshing assembly 30 comprised of an elongated partially foraminous casing 32 with an elongated rotor 34 mounted for rotation therewithin. As shown in FIG. 1, the housing or body 17 of the combine 10, in which the rotor assembly 30 is mounted, has a plenum-like configuration between upstream and downstream end portions 38 and 40, respectively, thereof. As is conventional, the upstream end portion 38 of housing 17 has a larger area than the downstream end portion 40 and opens to receive crop materials from the header assembly 20. Residue material are discharged from the downstream end portion 40 of housing 17.

The rotor assembly 30 likewise has an upstream end portion 42 arranged in crop material conveying relation relative to the upstream end portion 38 of the housing 17 and a downstream end portion 44 arranged in crop material conveying relation relative to the downstream end portion 40 of housing 17. As is conventional, a discharge beater 46 is arranged toward the downstream end 44 of the rotor assembly 30 for forcibly propelling residue materials discharged from the conveyor toward and through a residue material discharge outlet 50 defined by the housing or body 17 toward the downstream end portion 40 of the combine. As is well known in the art of rotary combines, a deflector member or pan 52 is arranged in operable combination with the rotary beater 46.

As shown in FIG. 1, combine 10 further includes a cleaning system 56. The purpose of the cleaning system 56 is to further separate a grain rich mixture from the straw, chaff, foreign matter and residue material passing outwardly from the rotor assembly 30. As well known in the art, the cleaning system 56 includes a blower or fan 58 for directing a generally horizontal stream of air toward a rear end of the combine 10. As is typical, the blower or fan 58 is arranged in operable combination with a pair of vertically spaced cleaning pans or sieves 60 and 62 that are each mounted for endwise reciprocation within the housing 17 of the combine 10. In rotary combines, it is typical to mount the blower or fan 58 toward the upstream end portion 38 of the rotor assembly 30 for creating an air stream that is directed upwardly through the sieves 60, 62 and beneath the rotor assembly 30 toward the residue material outlet 50. The air stream serves to separate the extremely light residue material from the grain rich mixture and entrains it in the air stream such that the heavier residue material separated by the rotor assembly and the lighter residue material from the cleaning system 56 is all carried toward and through the outlet 50 (FIG. 3) in the downstream end portion 40 of the combine housing 17.

In accordance with the present invention there is provided a spreader mechanism, collectively designated by reference numeral 66, which is mounted to and transversely across a rear end portion of the combine housing 17 in crop receiving relation with the residue discharge outlet 50. The spreader mechanism 66, according to the present invention, receives residue material passing from the rotary threshing assembly 30 and through outlet 50 and distributes the residue material in an outwardly directed stream that is relatively narrow in a fore-and-aft direction from a side of the combine 10.

Figure 2:
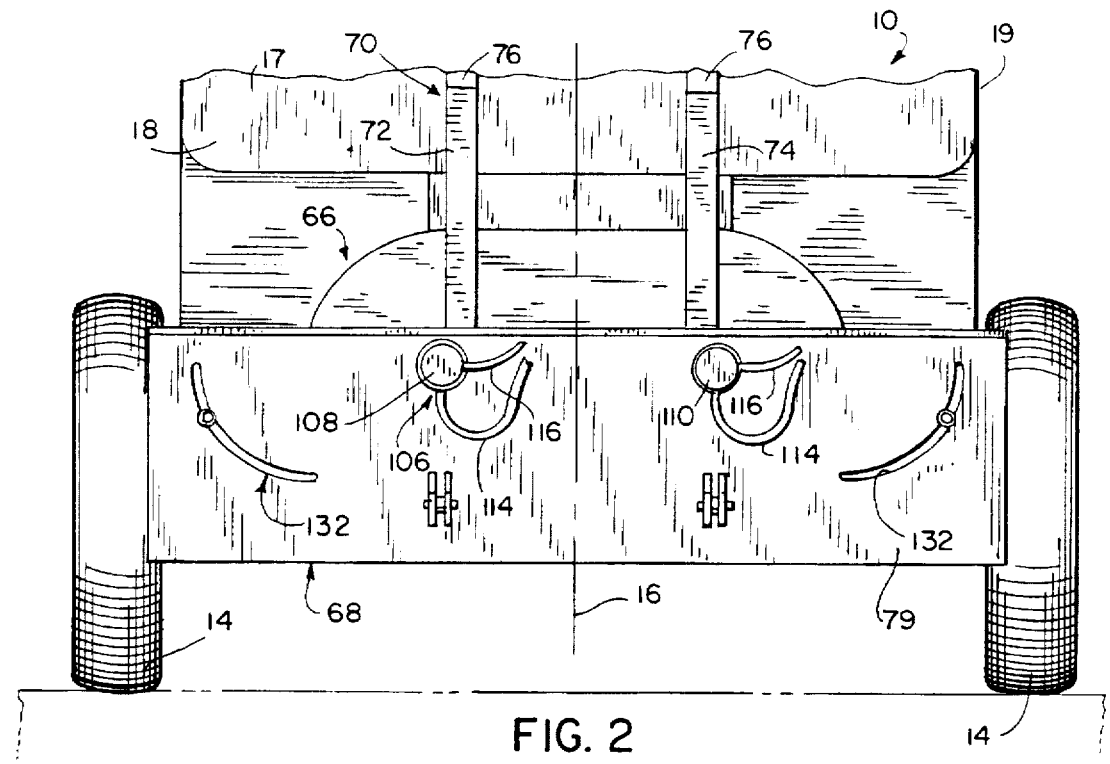
FIG. 2 is an enlarged rear elevational view of the combine illustrated in FIG. 1.
Figure 3:
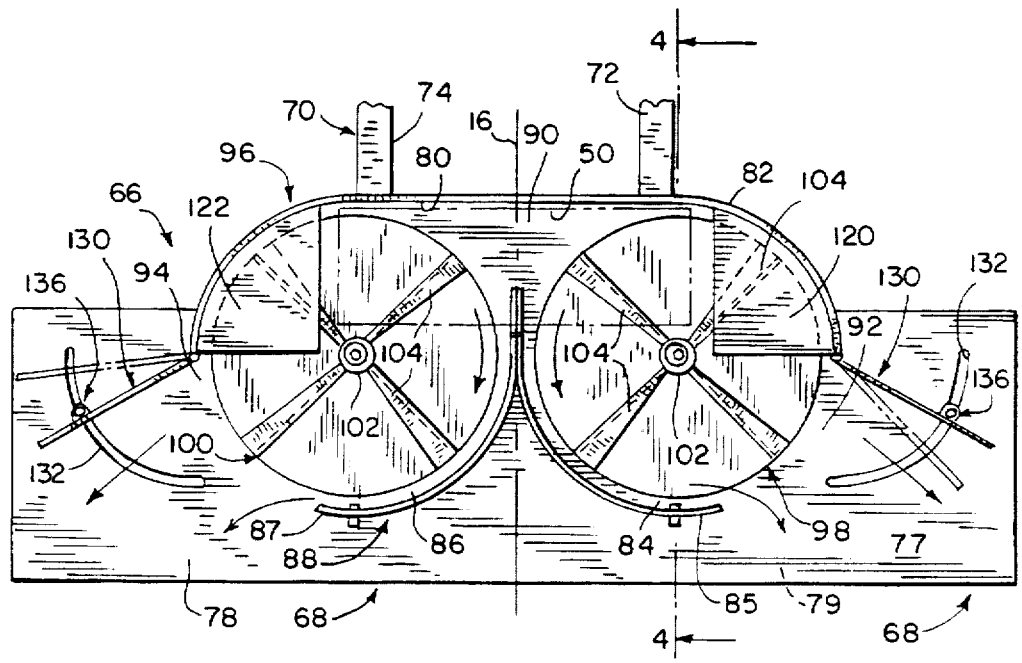
FIG. 3 is a view taken along line 3—3 of FIG. 1.

As shown in FIGS. 1, 2 and 3, the spreader mechanism 66 comprises a housing 68 mounted to the combine housing 17 by a suitable mounting structure 70 preferably including a pair of transversely spaced masts 72, 74 secured to and projecting upwardly from the housing 68. Intermediate their ends, each mast 72, 74 is provided with hinges 76 (FIG. 1) or other suitable structure permitting the housing 68 to be adequately moved to allow access to the rear end portion of the combine and, more specifically, to the cleaning area and cleaning system 56 of the combine.

As shown in FIGS. 3 and 4, housing 68 comprises a generally vertical wall portion 78 having front and rear sides or surfaces 77 and 79, respectively. Housing 68 is mounted and extends transversely across the rear or downstream end portion 40 of the combine housing 17 to inhibit residue material, passing outwardly from outlet 50, from moving past the rear side 79 thereof. On the front or forward side 77, housing 68 defines a recess 80 that opens forwardly to the threshing assembly 30 (FIG. 1) and to the residue material outlet 50. In the illustrated embodiment, the recess 80 in housing 68 is defined by a wrapper or shroud 82 including an arcuate wall portion extending forwardly from the front side 77 of the vertical wall portion 78 and at least partially above the outlet 50.

In a most preferred form of the invention, and as shown in FIG. 3, the recess 80 is divided into first and second recess portions 84 and 86, respectively, by a divider 88 likewise extending forwardly from the front or forward side 77 of the housing 68. In the embodiment shown, a lower portion of the divider 88 has bifurcated and arcuate shaped arms 85 and 87 that combine with and are disposed in an involuted relationship relative to the arcuate wall portions of the shroud 82 to define the recess portions 84 and 86.

In that embodiment of the invention having first and second recess portions 84, 86, respectively, it is to be noted that the recess portions 84, 86 are disposed on opposite sides of the longitudinal axis 16 of the combine 10. Notably, in a most preferred form of the invention, the divider 88 does not extend to the top of the wrapper or shroud 82 such that an opening or passage 90 is provided between the first and second recess portions 84 and 86, respectively. Moreover, the arcuate wall portion of the shroud 82 and the divider 88 combine to define two exhaust outlets 92 and 94 that open to the opposite sides 18, 19 (FIG. 2) of the combine 10.

In a preferred form of the invention, the spreader mechanism 66 further includes a driven vaned assembly 96 arranged within the recess 80 of the housing 68 about a generally horizontal axis extending generally parallel to the longitudinal axis 16 of the combine 10. Upon rotation, the vaned assembly 96 mixes and imparts movement to residue material received from the exhaust outlet 50 such that the residue material is exhausted in a generally uniform pattern extending to the side rather than to the rear of the combine housing 17.

In a preferred form, the vaned assembly 96 is configured with first and second bladed discs 98 and 100 that each rotate about a generally horizontal axis extending generally parallel to the longitudinal axis 16 of the combine 10. The first bladed or vaned disc 98 is rotatably mounted within the first recess portion 84 of the housing 68 while the second bladed or vaned disc 100 is rotatably mounted within the second recess portion 86 of housing 68.

The first and second bladed or vaned discs 98 and 100, respectively, are substantially similar in construction relative to each other. Accordingly, only vaned member or fan 98 will be discussed in detail with the understanding that the other vaned disc or fan 100 is substantially similar thereto. As shown in FIG. 4, each vaned disc 98, 100 preferably includes a plate-like disc 101 configured to rotatably fit within a respective recess portion 84, 86 of housing 68 and having a hollow hub 102 axially extending forwardly from the disc 101 with a series of vanes or blades 104 extending radially outward therefrom. To add strength and rigidity thereto, each vane or blade 104 is secured along a rear edge to the disc 101 and to the hub 102. The vanes or blades 104 are equally disposed about and extend in generally equal angular orientations relative to each other and outwardly from the hub 102. In the illustrated embodiment, each vaned disc or fan 98, 100 includes four blades 104 outwardly extending from the respective hub 102 of the vaned member. Between opposite ends thereof, each vaned or bladed fan member 104 is configured to mix the chaff, husks, and straw comprising the residue material and impart movement to such residue material in response to rotary movement of the vaned member or fan. In a most preferred form of the invention, and between opposite ends thereof, each vaned member 104 has a slanted back design in the direction of rotation of the fan 98, 100 to promote the capture of residue material and to impart movement of the residue material along the blade surface toward the disc 101 of the respective fan 98, 100.

As shown in FIGS. 2 and 4, the spreader mechanism 66 further includes a drive mechanism 106 for driving said vaned assembly 96 (FIG. 3) at selected speeds. In the illustrated form of the invention, the drive mechanism 106 includes individual motors 108 and 110 for driving the vaned discs 98, 100 in opposite rotational directions relative to each other. The motors 108, 110 are preferably configured as hydraulically driven motors that are connected to a suitable power source such as a conventional hydraulic pump (not shown) mounted on the frame of the combine 10. Understandably, it is within the spirit and scope of the present invention that other forms of separate drives, such as belt and pulley drives, be used rather than motors. Suffice it to say, whatever particular drive is used, the blades discs 98 and 100 are preferably independently driven relative to each other.

In the illustrated embodiment, the drive motors 108 and 110 are substantially identical. According a detailed description of drive motor 108 will suffice for an understanding of both drive motors 108 and 110. As shown in FIG. 4, each drive motor 108, 110 includes a housing 112 that is mounted to the housing 68 of the spreader apparatus 66. In the illustrated embodiment, suitable conduits 114 and 116 direct hydraulic fluid flow to and from the respective motor. An output shaft 118 of each motor 108, 110 extends through and forwardly of the front or forward side 77 of the housing 68 such that the hub 102 of a respective vaned member 98, 100 is suitably attached thereto.

As shown in FIG. 3, in the particular embodiment shown, housing 68 of the spreader mechanism 66 further includes a pair of transversely spaced members 120 and 122 extending inwardly and downwardly from opposite side portions of the shroud 82. The members 120, 122 are secured and depend from a forward edge of the shroud 82 and are disposed axially forward of the outer edge of each bladed disc 98, 100. The purpose of the members 120, 122 is to inhibit residue material from inadvertently exhausting from the recess 80 of the shroud 82 upon driven rotation of the vaned assembly 96.

Returning to FIG. 3, the spreader apparatus 66 of the present invention further includes a wing or vane 130 associated with each exhaust outlet 92, 94 through which residue material is exhausted from the housing 68 of the spreader mechanism 66. The purpose of each wing or vane 130 is to control the discharge of residue material from the respective outlet 92, 94. As shown, a proximal end of each wing or vane 130 is preferably pivotally attached to the shroud portion 82 of the housing at the upper limit of the respective exhaust opening 92, 94 defined thereby. Each vane or wing 130 preferably has a generally planar configuration and a width substantially equal to the width of the shroud 82. Each vane or wing 130 extends radially outwardly and away from the respective exhaust outlet 92, 94. Intermediate opposite ends thereof, each vane or wing 130 is attached to the housing 68.

In a most preferred form of the invention, each vane or wing 130 is adjustably secured to the housing 68. To effect such ends, housing 68 is provided with an arcuate and vertically elongated slot 132 that is concentric with the location whereat the respective vane or control wing is pivotally attached to the housing 68. A conventional fastener 136 (FIG. 6) passes through the slot 132 to allow the wing or vane 130 to be attached to the housing 68 in an infinite number of positions thereby allowing the residue material passing through the respective exhaust opening 92, 94 to be targeted for distribution at a location disposed a predetermined and yet spaced distance from the side of the combine 10.

In a preferred form of the invention, the divider 88 is configured for adjustment in several different respects. First, the divider 88 is configured such that the bifurcated and arcuate shaped arms 85 and 87 are movable toward and away from the radial outermost edges of the blades 104 of the bladed discs 98 and 100. As such, the clearance and capacity of residue material to pass between the disc blades 104 and the inner periphery of each recess portion 84, 86 on housing 68 is adjustable to influence the amount of material to be exhausted through the respective outlets 92 and 94 of the housing 68. Moreover, and as shown in FIG. 4, the divider 88 is preferably adjustable in an axial direction toward and away from the residue discharge outlet 50 as shown by arrow 89. The ability to adjust the divider 88 axially maximizes the transference of residue materials between the discharge outlet 52 and the spreader mechanism 68. Preferably, and in one form, housing 68 is configured to allow an axial extension 140 of the divider 88 to extend to the rear side 79 of the vertical wall portion 78 of the housing 68 whereat the axial extension 140 is secured in an axially adjustable position to the housing 68 as by a releasable fastener 142.

Another aspect of the present invention relates to the ability of the spreader mechanism 66 to limit the effect that windy weather conditions have on the ability to spread residue materials in a broad and substantially uniform pattern. Because the spreader mechanism 66 of the present invention uniquely distributes residue material to opposite sides 18, 19 of the combine 10, the spreader mechanism 66 preferably includes a curtain or shield 150 that extends for a substantial distance outwardly from opposite terminal ends of the spreader mechanism 66.

Figure 5:
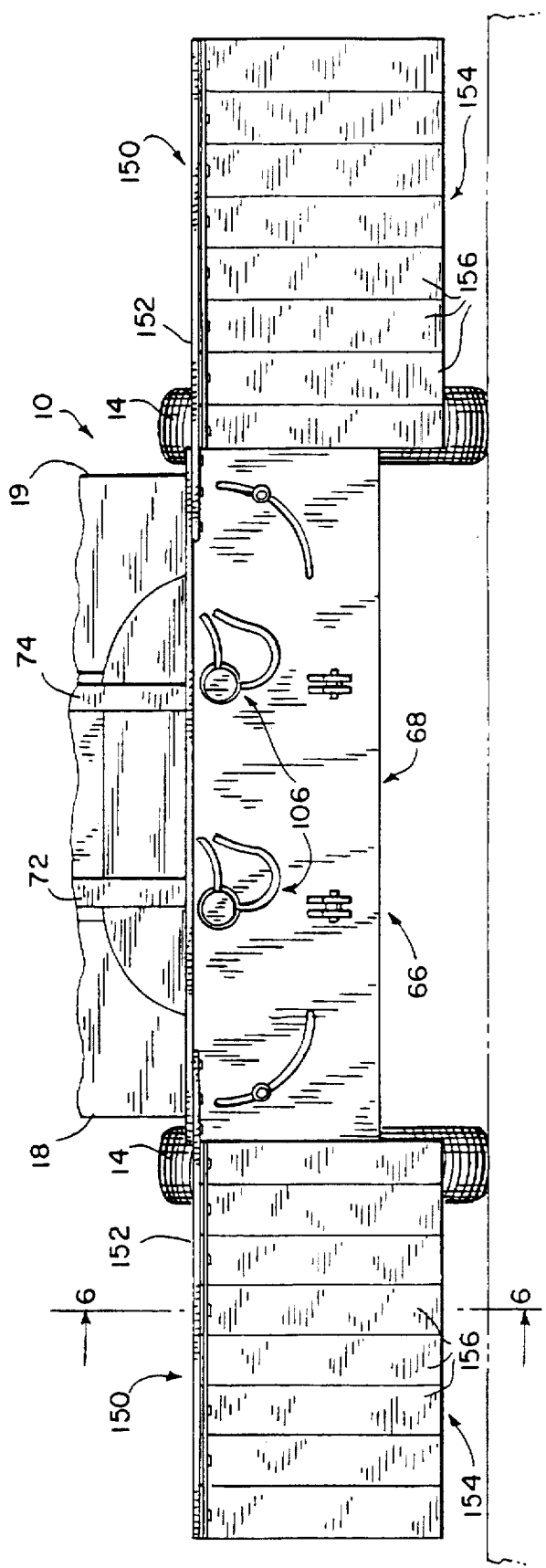
FIG. 5 is a rear view similar to FIG. 2, but showing wind shields attached to the discharge apparatus of the present invention.

As shown in FIGS. 5 and 6, the curtain or shield 150 preferably comprises an elongated mount 152 that extends for a substantial distance transversely away from the terminal end of the housing 68 along a path extending above the exhaust outlets 92 and 94 on the housing 68. Preferably, the proximal end of the mount 152 is releasably attached to the housing 68 to facilitate connection or disconnection of the shield 150 to the spreader mechanism 66 depending on weather conditions. Depending from and attached to the mount 152 is a vertically disposed windshield or curtain 154 preferably comprised of a series of vertical flaps 156 whose terminal end is disposed slightly above the ground surface and that inhibit the wind from moving therepast.

Figure 7:
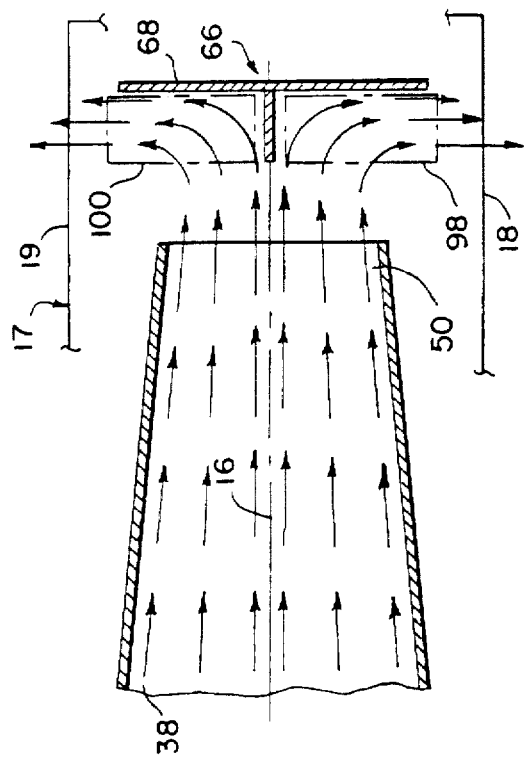
FIG. 7 is a schematic flow diagram illustrating movement of materials through the combine.

During operation, the combine 10 is driven across a field and the header assembly 20 gathers the harvested crop material and introduces the crop material at the upstream end 38 of the combine 10. The rotary threshing assembly 30 thereafter threshes the harvested crop material to separate a heavier grain mixture from the straw, stems and other large residue material. The residue materials including straw, end tailings, husks and the like are discharged from the downstream end portion 44 and are forcible propelled rearwardly toward the exhaust outlet 50 by the discharge beater 46. Additionally, the horizontal stream of air developed by the fan 58 of the cleaning system 56 furthermore entrains lighter weight residue material therewith that are also directed out the exhaust outlet 50. As shown in FIG. 7, the housing 17 of the combine 10 is configured such that the air stream produced by the fan 58 of the cleaning system 56 intensifies or is concentrated as it passes toward and through the exhaust outlet 50 at the downstream end portion 40 of combine 10.

The spreader mechanism 66 of the present invention thereafter directs the residue material to opposite sides 18, 19 of the combine housing 17. Notably, the spreader mechanism 66 is configured such that the residue material to be distributed is targeted to be projected outwardly a substantially distance from the side 18, 19 of the combine and in a relatively narrow fore and aft stream from the side 18, 19 of the combine 10. The ability to target the location whereat the residue material is aimed is made possible through the use of the vanes or wings 130 arranged adjacent the outlet 94, 96 to control the residue material passing outwardly therethrough.

The spreader mechanism 66 of the present invention is particularly useful in combination with a rotary combine having the cleaning system 56 that utilizes a blower or fan 58 arranged toward an upstream end 38 of the rotor assembly 30 for directing a generally horizontal stream of air toward the discharge outlet 50. As schematically presented in FIG. 7, the spreader mechanism 66 of the present invention accepts the cleaning air passing outwardly from the discharge opening 50 and redirects the air stream to opposite sides 18, 19 of the combine housing 17. During operation, the vaned discs 98 and 100, disposed on opposite lateral sides of the longitudinal axis 16, combine with the housing 68 and act as fans that draw the air and residue materials entrained therewith through the exhaust opening 50 and redirect the air and residue materials to the sides 18, 19 of the combine housing 17. The rotation of the vaned discs 98, 100 furthermore serves to mix the lighter residue material entrained with the air stream with the heavier straw and husks to forcibly propel the residue material including the very light residue materials out the exhaust outlets in a stream of air that is targeted to be projected a substantial distance from the side of the combine.

As mentioned above, the vanes or wings 130 leading from the exhaust outlets 92, 94 of the housing 68 serve to control the discharge of residue material from the spreader mechanism 66. The particular setting or inclination of the control vanes or wings 130 relative to the respective exhaust opening 92, 94 controls the material spread to opposite sides 18, 19 of the combine housing 17. That is, testing has revealed that setting the vanes or wing s 130 in a particular angular setting translates into a predetermined width of spread of residue material. Moreover, and because the residue material is distributed under the influence of an air stream having a narrow fore and aft width, the residue material is spread in a generally uniform pattern across a path that is extremely wider than that capable of being developed by heretofore known spreader mechanisms.

For different reasons, including the moisture content of the harvested materials, tests have revealed that it is not uncommon for residue materials to be spread more to one side of the combine than the other. The present invention addresses this particular concern through the drive mechanism 106. More specifically, if the operator should notice that residue materials are being spread more to one side of the combine than the other, the operator merely adjusts the individual drives 108, 110 of drive mechanism 106 such that the relative speeds of the rotating vaned discs 98, 100 are appropriately set. Testing of the present invention has further revealed that the vertical vaned disc that is spinning about its horizontal axis at a speed greater than the other rotating disc will tend to cause transfer of residue material from one vertical spinning disc to the other thereby redistributing the residue material such that both sides 18, 19 of the combine are provided with a substantially even distribution of residue materials. As will be appreciated, the opening or passage 90 provided between the divider 88 and the top of the wrapper or shroud 82 permits the transference of residue materials between recesses 84 and 86 and as a function of the relative rotating speeds of the discs 98, 100.

As will be appreciated, the ability to move the divider 88 associated with the housing 68 axially toward and away from the discharge outlet 50 further serves to facilitate transference of residue materials to the exhaust outlets 92, 94. As long as the rotor assembly 30 and discharge beater 64 adequately deliver, as through forcible propulsion, the residue material to the spreader mechanism 66 the rotating discs 98 and 100 of the vaned assembly 96 thereafter serve to propel the residue material out the exhaust outlets 92 and 94. Should conditions occur, however, where the rotor assembly 30 and/or discharge beater 64 are not effective in transferring residue material between the discharge outlet 50 and the spreader mechanism 66, the divider 88 can be axially adjusted toward the discharge outlet 50 to receive residue material that is subsequently acted upon by the rotating discs 98 and 100. In the most preferred form of the invention, the bifurcated arms 85 and 87 of the divider 88 are adjustable toward and away from the edge of the blades 104 of the vertically rotating discs 98 and 100 to effect the concentration of residue material passing out of the exhaust outlet 92 and 94 of the spreader mechanism 66 as well as the uniformity of material coverage as a function of the distance measured from the side of the machine 10.

Furthermore, mounting the wind shield 150 in operable association with the spreader mechanism 66 can further prove useful in promoting the even distribution of residue material from the spreader mechanism 66. Because the wind shield 150 extends above the discharge outlets 92, 94, it protects the residue materials that are directed outwardly under the influence of the redirected air stream from the vaned assembly 96 and to opposite sides of the combine frame. Accordingly, the wind shield 150 adds benefits by blocking windy weather conditions from influencing the spread of residue materials over a broad area and under the effect of an air stream directed outwardly by the driven vaned assembly 96 that rotates about an axis extending generally parallel to the longitudinal axis of the machine 10.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A spreader mechanism mountable to an agricultural combine including a threshing assembly to separate harvested material into a granular material mixture and a residue material and a cleaning system to further separate lighter residue material from the granular material mixture, said spreader mechanism comprising an apparatus configured to receive and mix the residue material from the threshing assembly and the lighter residue material from the cleaning system, the apparatus further configured to distribute the mixed residue materials in an outwardly directed stream from a side of the combine, said apparatus including a member rotatable about a generally horizontal axis extending in a fore-aft direction of the combine and configured such that the mixed residue materials to be distributed are projected outwardly in said stream a substantial distance from the side of the combine.

2. The spreader mechanism according to claim 1 wherein said apparatus includes a housing having a recess defined therein to receive the residue material from said threshing assembly and the lighter residue materials from the cleaning system, the housing having a wall portion including an exhaust outlet, and further wherein the rotatable member is disposed in the recess of said housing to impart movement to the residue material received from the threshing assembly and the lighter residue materials from the cleaning system and to direct the mixed residue materials outwardly through said exhaust outlet.

3. The spreader mechanism according to claim 2 wherein said apparatus further includes a drive mechanism to drive the rotatable member at selected speeds.

4. The spreader mechanism according to claim 2 wherein said apparatus further includes a second rotatable member disposed in a second recess of said housing to impart movement to and direct the mixed residue materials outwardly from another exhaust outlet defined in the wall portion of said housing.

5. The spreader mechanism according to claim 4 wherein an individual drive mechanism operably associated with each rotatable member is provided to allow said rotatable members to rotate at adjustable speeds, relative to each other.

6. The spreader mechanism according to claim 4 wherein said apparatus further includes vertically disposed walls extending outwardly in opposite directions from opposite sides of said housing to enhance relatively even distribution of the mixed residue materials discharged from opposite sides of said combine.

7. The spreader mechanism according to claim 4 wherein a passage is provided between the first recess and the second recess of the housing to allow the residue materials to pass between the first and second recesses to effect a generally uniform distribution of the mixed residue materials to the exhaust outlets.

8. The spreader mechanism according to claim 2 wherein said apparatus further includes a wing extending outwardly from the exhaust outlet in said wall portion to control a maximum distance of spread of the mixed residue materials discharged from said apparatus.

9. The spreader mechanism according to claim 2 wherein the wall portion is axially adjustable relative to the housing toward and away from the threshing assembly and the cleaning system to facilitate the transference of the residue material and the lighter residue material to the apparatus.

10. A spreader mechanism for use in combination with an agricultural combine having a header assembly to harvest material as the combine is driven across a field, a threshing assembly arranged in material receiving relation relative to said header assembly for threshing the harvested material into a grain rich mixture and a residue material, a cleaning system including a blower to direct a stream of air through the grain rich mixture so as to entrain and separate lighter residue material therefrom, said spreader mechanism comprising an apparatus arranged in material receiving relation relative to the threshing assembly so as to receive the residue material therefrom and in material receiving relation relative to the cleaning assembly so as to receive the stream of air from said blower with the lighter residue material entrained therein, the apparatus being configured to mix the residue material from the threshing assembly and the stream of air with the lighter residue material entrained therein and to redirect the mixed residue materials outwardly from a side of the combine so as to distribute the mixed residue materials together to the ground over which the combine moves.

11. The spreader mechanism according to claim 10 wherein said apparatus includes a rotary vaned disc mounted on a housing to mix the residue material from the threshing assembly and the lighter residue material from the cleaning system and to redirect the mixed residue materials toward the side of the combine.

12. The spreader mechanism according to claim 11 wherein said vaned disc rotates about a generally horizontal axis extending in a fore-aft direction of the combine.

13. The spreader mechanism according to claim 11 wherein said housing includes a wall axially extending from said housing to define a recess wherein said vaned disc is rotatably arranged, the recess being open to the threshing assembly and the cleaning system.

14. The spreader mechanism according to claim 13 wherein a portion of said wall is axially adjustable relative to said housing toward and away from said threshing assembly and said cleaning system to facilitate the transference of the mixed residue materials to said apparatus.

15. The spreader mechanism according to claim 13 wherein the wall of the housing has an outlet defined therein through which the mixed residue materials are distributed outwardly from the side of the combine, said apparatus further includes a wing arranged in combination with said housing and extending outwardly from the outlet in said wall to control a maximum distance of distribution of the mixed residue materials distributed outwardly through said outlet to the ground.

16. The spreader mechanism according to claim 10 wherein said apparatus includes first and second rotary vaned discs mounted within recesses defined in a housing in side-by-side relation relative to each other on opposite sides of a longitudinal axis of said combine, each of the first and second rotary vaned discs rotating about a generally horizontal axis parallel to the longitudinal axis of the combine.

17. The spreader mechanism according to claim 16 wherein said apparatus further includes a drive mechanism for said first and second vaned discs to redirect the stream of air from the blower toward opposite sides of the combine and in a direction generally normal to the direction developed by the blower of the cleaning system.

18. The spreader mechanism according to claim 17 wherein said drive mechanism comprises a separate drive mechanism for independently driving each of the first and second vaned discs.

19. The spreader mechanism according to claim 16 wherein said housing includes an axial wall projecting from a generally transverse wall of the housing, said axial wall defining the recesses wherein said first and second vaned discs are mounted for rotation.

20. The spreader mechanism according to claim 19 wherein the wall has opposite outlet openings through which the mixed residue materials are directed outwardly from opposite sides of the combine.

21. The spreader mechanism according to claim 20 wherein a passage is defined between the recesses to allow the residue materials to pass between said recesses to effect a generally uniform distribution of the mixed residue materials to opposite sides of the combine.

22. The spreader mechanism according to claim 20 further including a wing provided on the housing and extending outwardly from each opening through the axial wall to control a maximum distance of discharge of the mixed residue materials from each side of the combine.

23. An agricultural combine having a mobile frame with a longitudinal axis, a harvesting assembly mounted toward one end portion of the frame for harvesting crop material and directing the harvested crop material to a separating assembly wherein the harvested crop material is separated into a grain rich mixture and a residue material, a cleaning system provided on the frame to further separate lighter residue material from the grain rich mixture, and an apparatus connected to the frame to receive and mix the residue material from the separating assembly and the lighter residue material from the cleaning system, the apparatus further configured to distribute the mixed residue materials in an outwardly directed stream from at least one side of the combine, the apparatus including at least one member rotatable about an axis extending generally parallel to said longitudinal axis of the combine to distribute the mixed residue materials from said separating assembly to the side of the combine.

24. The agricultural combine according to claim 23 wherein said apparatus includes a housing having a recess arranged in material receiving relation relative to said separating assembly and the cleaning system, said recess being defined by a shroud having an exhaust outlet disposed about a periphery of said shroud to allow the mixed residue materials to be exhausted therefrom to the side of the combine.

25. The agricultural combine according to claim 23 further including a vertically disposed wall extending laterally away from said apparatus on the at least one side of said combine for enhancing relatively even distribution of the mixed residue materials exhausted from said apparatus.

26. The agricultural combine according to claim 23 wherein said apparatus comprises a housing having two recesses defined therein, each recess arranged in material receiving relation relative to said separating assembly and the cleaning system and disposed on opposite sides of the longitudinal axis of said combine, said recesses being defined by a shroud carried by said housing, the shroud having exhaust outlets disposed in opposed relation relative to each other about the periphery of said shroud for allowing the mixed residue materials to be exhausted from opposite sides of the combine.

27. The agricultural combine according to claim 26 wherein the at least one rotatable member of said apparatus includes a vaned member rotatably mounted in each of said recesses for imparting movements to and causing the residue materials received and mixed by said apparatus to be exhausted through said outlets and from opposite sides of the combine.

28. The agricultural combine according to claim 27 further including a drive assembly for independently driving the vaned members relative to each other.

29. The agricultural combine according to claim 26 wherein said apparatus further includes a wing proximate each outlet to control a maximum distance of discharge of the mixed residue materials from said apparatus, each wing being mounted on said housing in predetermined relation relative to the respective exhaust outlet in said shroud.

30. The agricultural combine according to claim 29 wherein each wing is adjustably mounted relative to the housing to allow the maximum distance of distribution of the mixed residue materials to be independently controlled from each side of the combine.

31. The agricultural combine according to claim 26 wherein a passage is provided between the two recesses of the housing to allow the residue materials to pass between the recesses to effect a generally uniform distribution of the mixed residue materials to opposite sides of the combine.

32. An agricultural combine, comprising:

an elongated mobile frame with a housing mounted thereon, said housing defining a longitudinal axis and including a wall with upstream and downstream end portions defining a plenum-like enclosure;

a crop harvesting assembly carried toward a forward end of the frame and operable to harvest crop material from a field;

a crop material separator including an elongated generally cylindrical rotor assembly arranged in crop material receiving relation relative to said crop harvesting assembly and having upstream and downstream end portions in crop material conducting relation with a crop material inlet proximate the upstream wall portion of the housing and a residue material outlet proximate the downstream wall portion of the housing, the crop material separator separating the harvested crop material into a grain rich mixture and a residue material wherein the residue material is directed toward and through the residue material outlet;

a cleaning system including a blower arranged beneath said rotor assembly to create an air stream directed beneath the rotor assembly and toward the residue material outlet such that lighter residue material is separated from the grain rich mixture; and an apparatus arranged in crop receiving relation to said residue material outlet and across a rear end portion of the housing to receive and mix the residue material from the crop material separator and the lighter residue material from the cleaning system, the apparatus being configured to redirect and discharge said mixed residue materials in a direction generally normal to the longitudinal axis of said housing and from a side of the combine.

33. The agricultural combine according to claim 32 wherein said apparatus includes a shroud having a recess open to the crop material separator and the cleaning system and including a wall portion having an outlet through which the mixed residue materials are exhausted, the apparatus further including a vaned member arranged in said recess for rotation about a horizontal axis parallel to the longitudinal axis to impart movement to and direct the mixed residue materials outwardly through said exhaust opening.

34. The agricultural combine according to claim 33 wherein said apparatus further includes a wing positioned proximate to and extending outwardly from said outlet in the wall portion to control a maximum distance of discharge of the mixed residue materials to the side of the combine.

35. The agricultural combine according to claim 32 wherein said apparatus includes a shroud having first and second recesses disposed on opposite sides of said longitudinal axis, each of the first and second recesses being open to the crop material separator and the cleaning system, said first and second recesses being defined by a wall portion extending toward said crop material separator and having outlets through which the mixed residue materials are exhausted to opposite sides of the combine, the apparatus further including first and second vaned members arranged in said first and second recesses, respectively, each vaned member being mounted for rotation about a horizontal axis to impart movement to and direct the mixed residue materials outwardly through the respective exhaust outlet.

36. The agricultural combine according to claim 35 wherein said apparatus further includes a wing positioned proximate to and extending outwardly from each oulet in said shroud to control a maximum distance of distribution of the mixed residue materials exhausted from each of said outlets.

37. The agricultural combine according to claim 35 wherein said apparatus further includes vertically disposed walls extending outwardly in opposite directions from said combine for enhancing relatively even distribution of the mixed residue materials to the ground.

38. The agricultural combine according to claim 35 wherein a passage is provided between the first recess and the second recess of the shroud to allow the residue materials to pass between the first and second recesses to effect a generally uniform distribution of the mixed residue materials to opposite sides of the combine.

39. The agricultural combine according to claim 32 wherein said apparatus further includes a drive mechanism to impart rotational movement independently of each of said first and second vaned members.

40. An agricultural combine, comprising:

an elongated mobile frame with a housing mounted thereon, said housing having upstream and downstream end portions;

a crop harvesting assembly carried toward a forward end of the frame and operable to harvest crop material from a field;

a crop material separator having upstream and downstream end portions, said upstream end portion of said crop material separator being in crop material conducting relation with a crop material inlet arranged toward the upstream end portion of said housing, and with said downstream end portion of said separator being arranged in crop conducting relation with a residue material outlet arranged toward a downstream end portion of said housing, the crop material separator separating the harvested crop material into a granular material mixture and a residue material wherein the residue material is directed toward and through the residue material outlet;

a cleaning system arranged within said housing and including a generally horizontal sieve arranged in material receiving relation relative to said crop material separator and a blower for directing a stream of air upwardly through the sieve to further separate lightweight chaff from the granular material mixture and to direct the chaff toward and through the residue material outlet under the influence of said air stream; and an apparatus arranged toward and across the downstream end portion of the frame in material receiving relation relative to said residue material outlet to draw the residue material from the crop material separator and the stream of air and the chaff entrained therein from the cleaning system through the residue material outlet and then mixing and redirecting the air with the residue material and chaff therein away from the residue material outlet to opposite sides of the frame in a direction generally normal to a longitudinal axis of the frame of the combine.

* * * * *